United States Patent [19]

Howard et al.

[11] 4,022,695
[45] May 10, 1977

[54] REMOVABLE FILTER CLOTH FOR A LEAF FILTER OF A PRESSURE VESSEL

[75] Inventors: Laurence M. Howard, Cresskill, N.J.; Robert Schaaf, Brooklyn, N.Y.

[73] Assignee: Air Filters, Inc., Brooklyn, N.Y.

[22] Filed: Nov. 10, 1975

[21] Appl. No.: 630,617

[52] U.S. Cl. .............................. 210/486; 210/331; 210/346; 55/369; 55/381
[51] Int. Cl.² ..................................... B01D 29/00
[58] Field of Search .......... 210/485, 346, 486, 331, 210/487, 461; 55/381, 369

[56] References Cited
UNITED STATES PATENTS

| 1,481,931 | 1/1924 | Schumann | 210/486 |
| 3,542,206 | 4/1968 | Geister | 210/486 |

FOREIGN PATENTS OR APPLICATIONS

| 828,568 | 2/1960 | United Kingdom | 210/486 |
| 945,065 | 12/1963 | United Kingdom | 210/486 |

Primary Examiner—Bernard Nozick
Attorney, Agent, or Firm—Friedman, Goodman & Teitelbaum

[57] ABSTRACT

A filter cloth for a leaf filter of a pressure vessel including a flat retaining sack or bag which encloses the leaf filter. An outlet opening is contained in the sack through which the filtered product can be extracted. A releasable closure device is provided along the greater part of one side edge of the sack to permit removal of the sack from the leaf filter for cleaning and replacement thereof. A reinforcing material is provided at the outlet opening to provide a tight seal about the outlet of the leaf filter. Preferably, the sack is substantially circular but may have any configuration conforming to the shape of the leaf filter.

4 Claims, 6 Drawing Figures

REMOVABLE FILTER CLOTH FOR A LEAF FILTER OF A PRESSURE VESSEL

BACKGROUND OF THE INVENTION

This invention relates to a pressure vessel and more particularly to an improved filter cloth for a leaf filter used in such a pressure vessel.

A pressure vessel is a common type of pressure filter which is utilized in various industries, including the manufacture of chemicals, paints and many pharmaceutical preparations. A pressure vessel is arranged with its axis either vertical or horizontal, where filter elements inside such a vessel may be either flat leaves or tubes, and may be assembled with their surface either horizontal or vertical. A cake is formed within the pressure vessel from the solid material which has been extracted from the filtered liquid.

The choice between a vertical and a horizontal filtering surface must take into account two conflicting factors, both of which arise from the fact that cake has a natural tendency to fall off either a vertical surface or the underside of a horizontal one. One the one hand, this tendency aids discharge of the cake at the end of a cycle; on the other, however, it presents the danger of cake falling off at a premature stage, notably when operation is interrupted for any reason, or when unfiltered slurry is being displaced from the vessel and wash liquor introduced. In practice, therefore, the horizontal leaf filters only through its upper surface, which means that half the surface is wasted and thus the cost of the filter increased; the construction is therefore generally limited to areas of less than some 600 sq. ft., but finds particular use where thorough washing is required.

In a horizontal vessel, such as a Sweetland filter, the leaves are vertically mounted, with the space between adjacent leaves being usually chosen to suit the cake thickness for a particular duty. The leaves are circular, static and each provided with its own independent filtrate outlet located at the top leading to an external common manifold pipe. Cake discharge is either wet, with suitable sluice nozzles, or day, when bottom of the filter is swung open.

A filter cloth is placed about each leaf. The slurry or other liquid to be filtered is introduced into the hollow portions of the vessel and passes through the filter cloth into the leaf. The filtered liquid is passed through the outlet contained within the filter cloth. As the process continues, the hollow space gradually fills with solid cake material from which the filtered liquid has been extracted. At regular intervals, the press is opened, the leaves separated, and the cake removed. The filter cloth must also be cleaned and replaced again or substituted by other filter cloths.

The filter cloth surrounding the leaf filter must be held in a water tight connection surrounding the leaf filter. To achieve this, some filter cloths surround three sides of the leaf filter in a U-shaped configuration with their open ends extending into the vessel frame itself so as to be held in place by the force of the frame against the leaf filter. However, while these filter cloths provide a tight fit around the leaf, they do not provide a sufficient water tight seal around the outlet opening from the leaf filter.

Other filter cloths are formed to completely surround the leaf filter on all sides except for the single opening in the filter cloth through which the outlet opening can pass. While these filter cloths may provide sufficient sealing around the filter plates by sewing or other permanent enclosing means, they are difficult to remove from the leaf filter for cleaning and replacement. In these latter types of filter cloths, it is necessary to either destroy the filter cloth by cutting in order to remove it from the leaf filter, or to remove the stitches and subsequently restitch and reseal the entire cloth around the leaf filter.

Another problem with the filter cloths heretofore used relates to the pattern blank from which they are formed. In most cases, the filter cloth is flat, since the leaf filter which it surrounds is of a thin flat shape. The filter cloth is usually formed of two identically shaped blanks which are separated and which are sewn together around their perimeters to form a complete enclosure which can fit around the leaf filter. However, in forming the enclosure a section is left unsewn to accommodate the outlet. Since the sections adjacent to the outlet opening are sewn or sealed together from two separate blanks, there is generally insufficient sealing provided in the immediate vicinity of the outlet opening.

SUMMARY OF THE INVENTION

It is accordingly an object of the present invention to provide an improved filter cloth for a leaf filter which avoids the aforementioned problems of prior art filter cloths.

Another object of the present invention is to provide an easily removable filter for a leaf filter.

Still a further object of the present invention is to provide a removable filter cloth for a leaf filter which contains improved sealing about the outlet of the leaf filter.

Still a further object of the present invention is to provide a filter cloth formed of a single unitary blank for improved sealing ability around the outlet of the leaf filter.

Another object of the present invention is to provide an improved filter cloth which contains a closure means to permit easy removability and replacement of the filter cloth from the leaf filter.

Yet another object of the present invention is to provide a filter cloth which includes reinforcing means to provide additional sealing ability about the outlet of the leaf filter.

Briefly, the invention comprises a filter for a leaf of a pressure vessel wherein the filter includes an enclosed retaining sack or bag formed of a filter medium for fitting over the leaf. An outlet opening is provided in the sack through which the filtered product can be extracted. Closure means are provided on the sack to permit opening of the sack, thereby permitting its removal from the leaf for easy cleaning and replacement. Reinforcing means is provided at the outlet opening to provide a tight seal about the outlet of the leaf.

In one embodiment of the invention, the retaining sack is flat and of a substantially circular shape and the closure means occupies the greater part of a semi-circular edge of the sack. The closure means can be, by way of example, a zipper.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which.

DESCRIPTION OF THE PREFERRED EMBODIMENT

Figure 1:
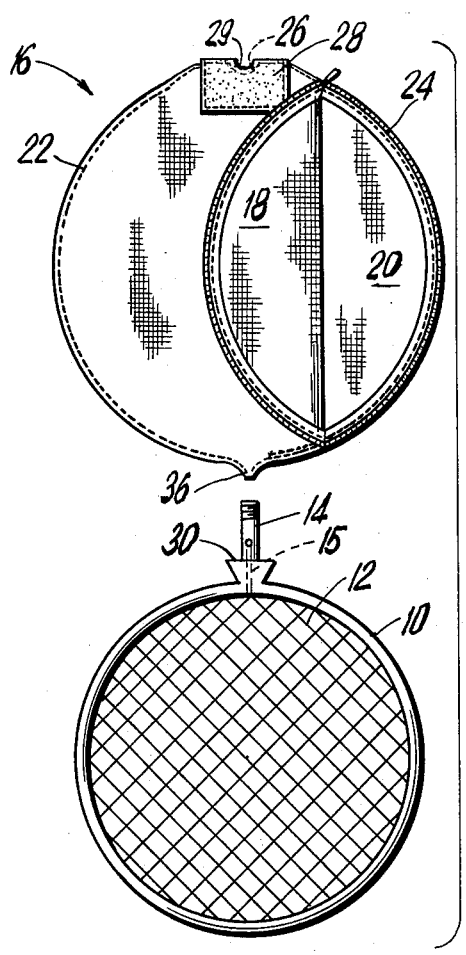
FIG. 1 is an elevational view of the leaf filter and filter cloth prior to their assembly.
Figure 2:
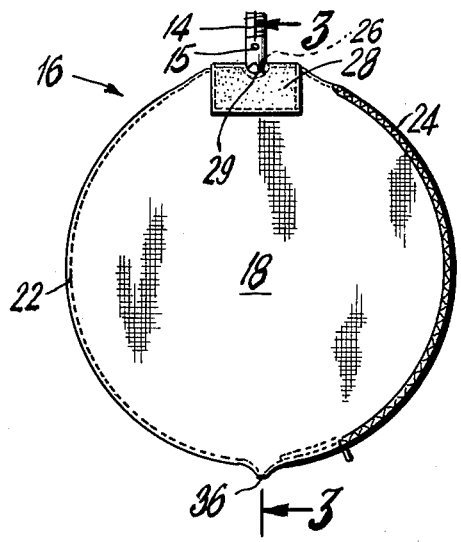
FIG. 2 is a side elevational view showing the assembled leaf filter with the filter cloth surrounding it.
Figure 3:
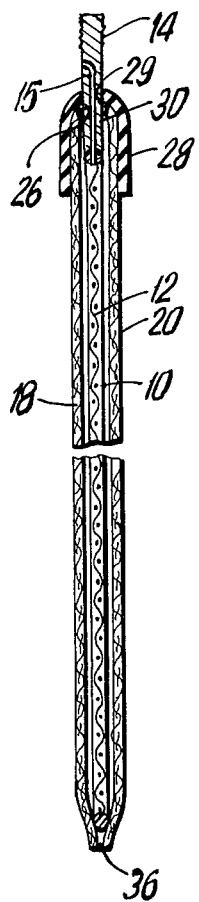
FIG. 3 is a sectional view taken along line 3—3 of FIG. 2.

A pressure vessel generally includes a number of leaf filters provided with a filter cloth around each one, held in place within the hollow vessel. Each leaf filter 10 is generally thin and flat and constructed of a hard material such as iron, wood or various types of metal. The leaf contains a screen mesh 12 through which the filtered fluid passes, where the screen mesh 12 functions to separate the inner front and rear facing portions of the filter cloth. An externally threaded outlet pipe 14 is located on the leaf filter. The pipe 14 is provided with an opening 15 through which the filtered fluid can be extracted. The pipe 14 is threadedly connected to vessel, where the outlets of each pipe lead to an external common manifold pipe.

The filter cloth of the present invention is shown generally at 16, and is formed as a substantially enclosed retaining sack or bag having front and rear portions 18 and 20 which preferably are of substantially circular shape. The front and rear portions are held together by sealing means such as stitches 22 sewn around the perimeter of the two portions.

A releasable closure means 24 is placed along the perimeter of the filter cloth and occupies the greater part of a semi-circular edge thereof. By way of example, the closure means is shown as a zipper. An opening 26 is located in the top of the filter cloth through which the outlet pipe tube 14 can pass. A reinforcing section 28 is placed on the top of the filter cloth which surrounds the opening 26 and provides an improved seal-tight enclosure around the outlet pipe 14. The opening 29 in the section 28 is smaller than the opening 26 in the filter cloth to provide the tight seal. The reinforced section can be formed of rubber or other material such as cloth or felt. The filter cloth itself can be formed of filter medium such as cloth, silk or the like.

In assembling the filter, the zipper 24 is first opened and the filter cloth 16 is positioned over the leaf filter 10 with the outlet opening 26 placed over the outlet pipe 14. The zipper is then closed providing a substantially complete enclosure about the leaf filter. The openings 26, 29 are sealed tightly about the outlet pipe 14. To provide additional sealing, a flanged section 30 is placed at the base of the outlet pipe 14 so that the reinforced section 28 can lie flat on the flange and enclose the pipe 14 in a tight seal.

After the leaf filter has been used, the filter cloth can be easily removed for cleaning by opening the zipper and removing the filter cloth from the leaf filter.

Figure 4:
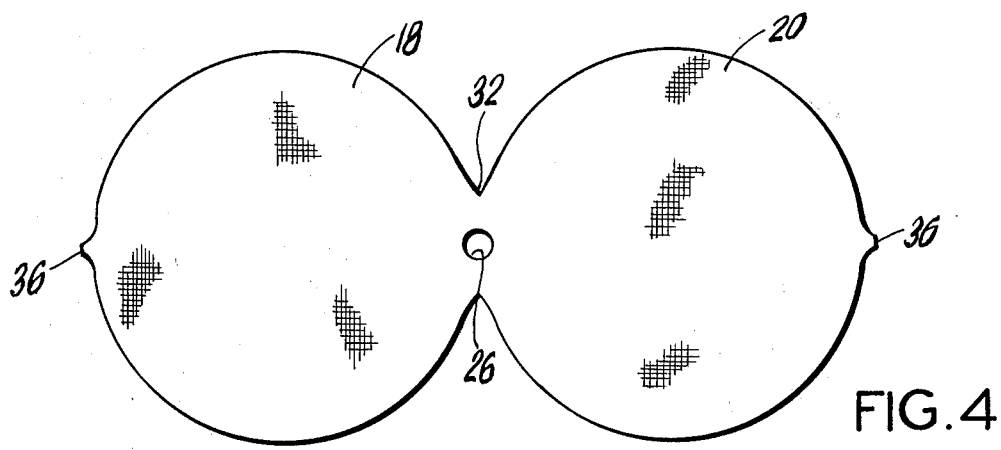
FIG. 4 shows the pattern blank from which the filter cloth is formed.
Figure 5:
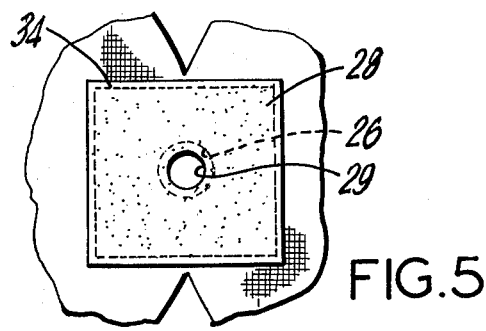
FIG. 5 is a fragmentary enlarged view of the pattern blank including the reinforced upper portion.
Figure 6:
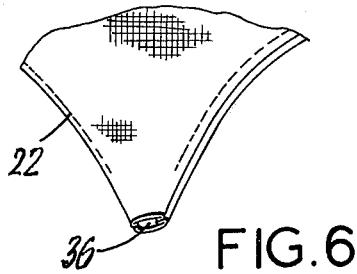
FIG. 6 is a fragmentary enlarged view of the lower portion of the filter cloth, showing a vent opening therein.

In forming the filter cloth of the present invention, a pattern blank is formed as shown in FIG. 4. The front and rear sections 18 and 20 are formed in substantially identical circular form out of a single piece of filtering medium. The two circular forms are joined integrally along an intermediate continuous tangential line or portion 32. The opening 26 is formed along the interconnecting tangential line or portion 32 between the two circular forms.

The reinforcing material 28 is then placed around the opening 26 in the area interconnecting the two circular forms, with the opening 29 being in the axial alignment with the opening 26. The reinforcement 28 can be connected to the blank by sealing means such as stitching 34. The pattern blank is then folded along the tangential interconnecting line or portion 32 and the perimeters of the two circular forms are fastened together by stitching 22 or other sealing means. The greater part of a semi-circular edge is not sealed and the closure means 24, such as the zipper, is connected along the edge.

A vent opening 36 is provided at the bottom of the filter cloth, diametrically opposed to the opening 26, to permit extracting any remaining material in the filter, thereby removing all of the fluid prior to opening the filter cloth and permitting its removal from the leaf filter.

By forming the filter cloth out of a single unitary pattern blank, the interconnecting portion 32 will not contain any seams or seals. Since the opening 26 is formed in the interconnecting portion, it insures greater sealability around the portion of the opening 26. Also, it insures greater strength at the portion 32 where the liquid flows out of the filter. It is understood, though the filter cloth has been described above as being substantially circular, the filter cloth may have any configuration conforming to the shape of the leaf filter, such as square, rectangular etc.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. A filter cloth for a leaf of a pressure vessel having a filtrate outlet, said cloth comprising an enclosed retaining sack disposable over the leaf, said retaining sack being flat and of a substantially circular shape, said sack being fabricated from a single unitary one piece blank of a filtering medium, said blank having a pattern of two substantially identical circular portions integrally interconnected along an intermediate portion thereof, said intermediate portion being disposed on a perimeter edge of said sack, said sack including an outlet opening through which the filtrate outlet is extendable so that a filtered product can be extracted, said outlet opening being disposed in said intermediate portion at said edge and extending therethrough, reinforcing means surrounding said outlet opening to provide a seal about the filtrate outlet, said reinforcing means including a unitary section of reinforcing material secured to an outer surface of said intermediate portion of said sack, said unitary section having an aperture extending therethrough, said aperture being in axial alignment with said outlet opening and being smaller than said outlet opening to provide a tight seal about the filtrate outlet, said sack including a vent hole positioned at a perimeter edge thereof in a diametrically opposed relationship with said outlet opening, releasable closure means disposed on said sack for opening said sack to install and remove it from the leaf, said closure means being located on a greater part of a semi-circular perimeter edge of said sack between said outlet opening and said vent hole, and means securely fastening together remaining mating perimeter edges of said circular portions other than said perimeter edges occupied by said outlet opening, said vent hole and said closure means.

2. A filter cloth as in claim 1, and wherein said reinforcing material is a rubberized substance.

3. A filter cloth as in claim 1, and wherein said closure means is a zipper.

4. A filter cloth as in claim 1, and wherein said filter is constructed of silk material.

* * * * *